UNITED STATES PATENT OFFICE.

CHARLES HEATON, OF BALLSTON SPA, NEW YORK.

IMPROVEMENT IN MEDICAL COMPOUNDS.

Specification forming part of Letters Patent No. 216,401, dated June 10, 1879; application filed April 5, 1879.

*To all whom it may concern:*

Be it known that I, CHARLES HEATON, of Ballston Spa, in the county of Saratoga and State of New York, have invented and discovered a Remedy and a Method for the Cure of Corns and Bunions; and I do hereby declare that the following is a full, clear, and exact description of the invention, which will enable others skilled in the art to which it pertains to make and use the same.

My invention consists in a compound of ammonia, alcohol, and honey, and tincture of cardamom, as hereinafter explained.

I take of cardamom-seed three hundred and sixty grains; caraway-seed, one hundred and twenty grains; cinnamon, three hundred grains; cochineal, sixty grains; and clarified honey, two ounces. These ingredients are placed in a suitable vessel and are percolated until six and a half pints are made by the addition of dilute alcohol and clarified honey. This provides me with the tincture of cardamom, which contains the requisite alcohol and honey. I now take one gallon of water and add thereto one-half ounce of ammonia and about one ounce of the above tincture of cardamom, which compound constitutes my remedy.

To apply the remedy, I saturate a sponge or other suitable material with my mixture, and place the same on or over or against the corn, and cover with oiled silk or gutta-percha tissue, (preferably the latter,) and let remain for several hours. It is best to apply at night on retiring to bed.

The application will remove all soreness from the surrounding flesh and will act on the corn, softening and disintegrating it, so that it may be removed without trouble or pain. This remedy, having as its base ammonia, alcohol, and honey, when applied will almost instantly relieve the pain attending an inflamed corn, and it will soften any corn so that the latter can be easily removed. The application of the impervious wrapping of gutta-percha or oiled silk prevents evaporation of the remedy, and thus retains the moisture and renders unnecessary more than a single application for the cure of a single corn.

The use of this remedy is attended with no serious results. The flesh is left in a healthy condition, so that no further applications of healing ointments are required to cause the cavity left by the removal of the corn to heal over.

I am aware that solutions of ammonia have been used for this purpose, and I do not claim, broadly, such solutions.

What I claim as my invention, and desire to secure by Letters Patent, is—

A compound for the treatment of corns and bunions, composed of the compound tincture of cardamom, ammonia, and water, taken in the proportions substantially as set forth.

In testimony that I claim the foregoing as my own I affix my signature in presence of two witnesses.

CHAS. HEATON.

Witnesses:
WILLIAM J. HILLIS,
W. H. OWEN.